United States Patent [19]

Germaine

[11] 4,401,236
[45] Aug. 30, 1983

[54] APPLIANCE FOR PICKING UP VERY SMALL ELEMENTS ONE BY ONE

[76] Inventor: Michel Germaine, 3 Sente des Bucherons, 76350 Oissel, France

[21] Appl. No.: 244,236

[22] Filed: Mar. 16, 1981

[30] Foreign Application Priority Data

Mar. 19, 1980 [FR] France ................. 80 06168

[51] Int. Cl.³ ............................................. B65H 3/08
[52] U.S. Cl. .................................. 221/211; 414/416; 414/627
[58] Field of Search ............... 221/211; 414/121, 416, 414/627; 294/64 R

[56] References Cited

U.S. PATENT DOCUMENTS

| | | | |
|---|---|---|---|
| 2,571,579 | 10/1951 | Jones | 414/121 |
| 3,957,263 | 5/1976 | Christl | 294/64 R X |
| 3,960,292 | 6/1976 | Knapp | 221/211 |
| 4,251,011 | 2/1981 | Hamilton et al. | 221/211 |

Primary Examiner—F. J. Bartuska
Attorney, Agent, or Firm—Stevens, Davis, Miller & Mosher

[57] ABSTRACT

An apparatus for sequentially picking up small elements one at a time comprising a hollow needle having an opening near its free end, and a tube sliding over the needle in a rapid oscillating motion to dislodge unwanted elements clinging near the needle opening. The apparatus can move between a position in which the needle is connected to a vacuum source dips into a receptacle to pick up one of the elements contained in the receptacle and a position in which the needle is connected to a pressure source allows the element to drop to a reception position.

18 Claims, 6 Drawing Figures

APPLIANCE FOR PICKING UP VERY SMALL ELEMENTS ONE BY ONE

This invention concerns an appliance allowing very small size elements to be picked up one by one without any of them being missed.

In many fields of application it is necessary to take very small solid elements one by one from a receptacle containing these elements in bulk and to transfer them one by one. This problem arises in the laboratory, for example, when it is required to pick up and count crystals. Another field in which the same problem is encountered is seeding and more especially seeding in lumps of compost. Germination in compost planting bricks is a method which has expanded considerably in the last few years in the market gradening and horticultural fields; it consists in producing, on a machine known as a compost brick press, lumps of compost which form a germination medium of outstanding quality of market gardening and flower seeds and in planting the seeds in these lumps. These compost planting bricks are, after germination and emergence of the seeds, put in place as they are by the market gardeners and horticulturists. The main difficulty of this technique lies in placing the seeds in the compost bricks. Thus, each brick produced by the planting brick press must receive one seed and one only.

Since the seeds of vegetable and flower plants are very small there is no appliance in existence at the present time which enables such seeds to be picked up one by one with certainty without missing any and transferred to the compost brick.

A known appliance for seeding compost bricks comprises a hollow needle having, close to its free end, an opening with a cross-section less than the size of the seeds to be picked up; this needle is inserted in a receptacle in which the seeds are held in suspension. A vacuum set up inside the needle attracts the seeds against the needle opening. However, it turns out that the likelihood of picking up one seed and one only using the needle of this known appliance is not satisfactory. Thus, since the seeds are in suspension in the air in the receptacle, sometimes no seeds attach themselves to the needle opening, or else several seeds attach themselves round the needle opening. In either case the result is imperfect seeding of the bricks.

In another known appliance used for seeding compost bricks the seeds are spread on a metal sheet and a hollow needle having an opening near its free end is moved over this plate so that, under the effect of the vacuum set up inside the needle, the seeds encountered by the needle attach themselves to the latter's opening. In this appliance also the needle may not encounter any seeds or else may meet several of them which then cling round the needle opening. In order to prevent the seeds from staying attached to the needle an edge is moved over this latter intended to hold back the surplus seeds. It nevertheless turns out that this known machine, which involves extremely accurate guidance of the needle with respect to the hold-back edge, does not make certain that one seed, and one only, stays attached to the needle every time either.

In order to get round this difficulty, which is due to the extremely small size of the seeds, and also to the varied shapes of the seeds (more or less spherical, oblong, flat), seed producers offer seeds coated with suitable neutral products like clay. These seeds thus converted into small pellets can then be picked up. However, the cost price of these so-called coated seeds is obviously much higher than for uncoated seeds. In spite of this the known appliance do not provide a satisfactory yield. The same is true for the sized seeds also offered by the seed producers.

Finally, there is a problem specific to seeding in compost bricks using the known appliances in the fact that the seeds, whether uncoated, sized or coated, are not pre-germinated. In fact planting pre-germinated seeds in compost bricks makes it possible to significantly cut down on the time needed, from seeding the bricks, to obtain big enough seedlings for placing the bricks with the horticulturer or the market gardener. Seeding with pre-germinated seeds is obviously not possible with coated seeds since pre-germination of these seeds, which is performed in a liquid medium, would destroy the coating on these seeds. Furthermore these pre-germinated seeds must remain in the liquid medium until the time of seeding, which means that they must be grasped directly in this liquid medium, which is impossible with the known appliances.

The object of this invention is an appliance for picking up very small size elements in order to transfer them to a reception position, this appliance ensuring that one element and one only is picked up at a time and transferred to the reception position. Another object of the invention is an appliance of the type specified above making it possible, on applying very simple modifications, to pick up and transfer one by one elements with different shapes and sizes. Finally, another object of the invention is an appliance of the type specified above enabling small size elements contained in a liquid medium to be picked up one by one and transferred to a reception position.

The appliance according to the invention for picking up very small size elements one by one and transferring them to a reception position consists of a hollow needle having near its free end an opening with a cross-section less than the size of the elements to be picked up. This appliance also comprises a system for inserting the needle from above into a receptacle containing the elements to be picked up, withdrawing it from this receptacle and transferring it to a reception position. This appliance also comprises a system for setting up a vacuum in the needle when this needle enters the receptacle and during the transfer of the needle to the reception position and for removing the vacuum or setting up a high pressure in the needle when it is at the reception position.

The appliance according to the invention also comprises a tube sliding with a clearance fit over the needle and provided with a rapid vibratory movement along the needle axis with an amplitude designed so that the bottom end of the tube is located above the needle opening when the tube is at the top dead centre and below it when the tube is at the bottom dead centre. This tube, provided with a vibratory movement, pushes off the needle opening and detaches from the needle, when the latter is in the receptacle, all the elements clinging round the needle opening under the effect of the vacuum, except for one single element occupying a central position relative to the needle opening.

If the elements to be picked up and transferred are spherical or roughly spherical, the said opening is advantageously made in the end of the needle, and the tube provided with a vibratory movement has an inside diameter which is greater than the diameter of the elements.

If the elements to be picked up and transferred have an oblong shape the needle is advantageously provided with a lateral recess a short distance above its free end, the depth and width of which fall towards the needle's free end, and the opening is made in the side of the needle and in the deepest and widest part of this recess.

In order to ensure correct action on the elements to be picked up by the low pressure obtaining inside the needle, i.e. at its opening, the tube provided with a vibratory movement is advantageously slit on the side or provided with an inner longitudinal groove or pierced with lateral holes a short distance above its lower end. This prevents the tube, which slides with very little clearance over the needle, from retaining seeds by suction at its bottom end, when it is in the lowermost position, under the action of the vacuum at the needle opening.

Referring to the appended drawings we shall describe below an embodiment which is illustrative and not restrictive of an appliance according to the invention; in the appended drawings.

Figure 1:
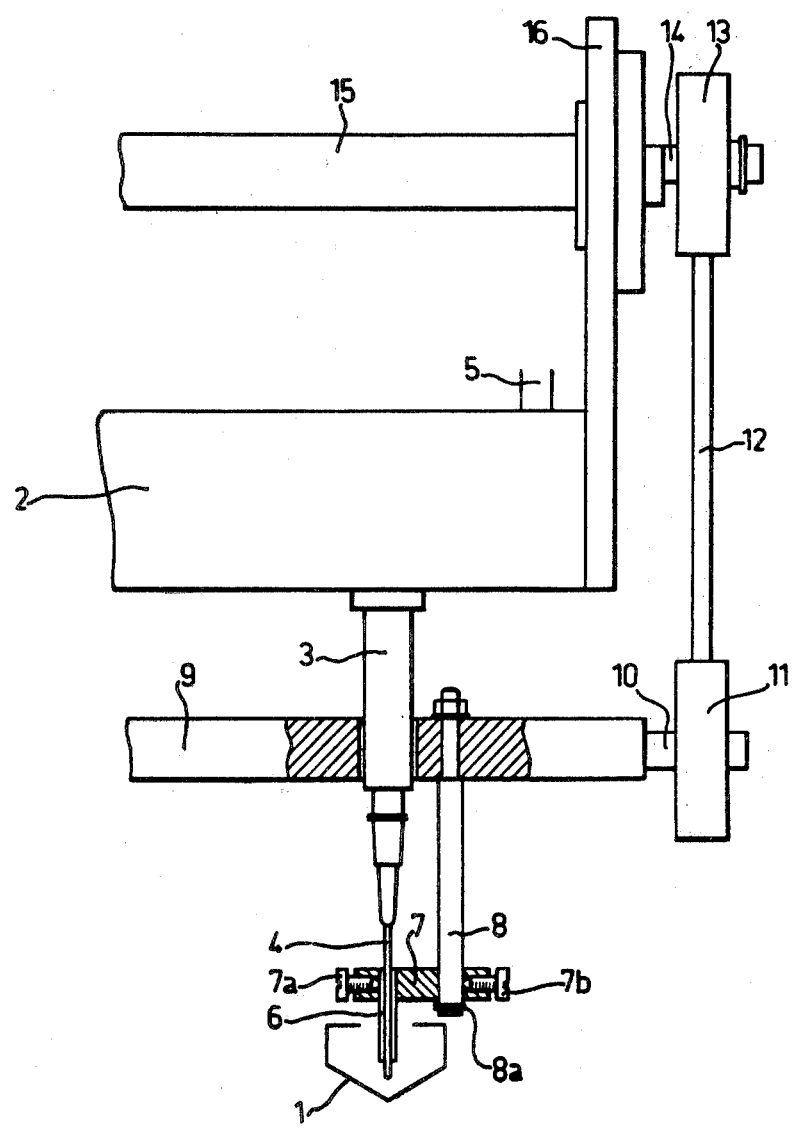
FIG. 1 is an elevation view, partly sectioned, of an appliance according to the invention, with the device imparting a vibratory movement to the tube sliding over the needle.

The appliance as illustrated by FIG. 1 is designed for seeding compost bricks as these bricks leave a planting brick press of a type known per se. This appliance is installed at the brick press exit above a conveyor belt on which the compost bricks leave the brick press in several longitudinal rows placed side by side. This conveyor belt which is not shown moves perpendicular to the plane of the drawing in FIG. 1.

Above each row of bricks resting on the conveyor belt there is a cup 1 installed containing seeds in bulk. A single cup 1 is shown in FIG. 1; the cups for the neighbouring rows of bricks are placed side by side (to the left in FIG. 1) at intervals corresponding to the spacing between the rows of bricks.

A cross box 2 extending over the whole width of the brick conveyor belt carries at the bottom a row of vertical mounts 3, each of which takes at its bottom end a hollow needle 4 provided with an opening near to its bottom end. The mounts 3 and the needles 4 are located side by side at intervals corresponding to the intervals between the cups 1. The box 2 comprises a connection 5 to which a vacuum source and, if need be, a pressure source are connected via a selector which is not shown.

Each needle 4 is surrounded with limited clearance by a tube 6. The tube 6 is fixed to a support 7 by means of a lock screw 7a, which allows the relative position of the tube 6 to be adjusted with respect to the support 7. The support 7 is installed to slide on a rod 8 which is parallel to the needle 4, has a bottom stop 8a for the support 7 and is itself fastened to a cross bar 9 covering the whole width of the brick conveyor belt. The bar 9 carries a rod 8 for the tube 6 of each needle 4.

The bar 9 slides on the mounts 3 of the needles 4 and has at each end a trunnion 10 only one of which is shown and on which the small end 11 of a connecting rod 12 is mounted. The big end 13 of the connecting rod 12 pivots on a crankpin 14 of a cross shaft 15 driven in rotation by a motor-variator unit not shown, via a belt, chain, gear or similar transmission. The shaft 15 is mounted near its two ends to rotate in side plates 16 also used to support the box 2.

Figure 2:
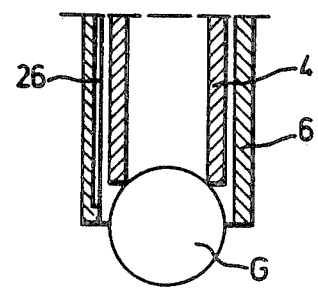
FIGS. 2, 3 and 4 show several embodiments of the needle to pick up elements of different shapes.

FIG. 2 shows an embodiment of the bottom end of the needle 4. This needle is shaped to pick up from inside the cup 1 a seed G which is roughly spherical in shape. The hollow needle 4 is open at its bottom end, the inside diameter of the needle 4 being less than the diameter of the seed G. On the other hand the inside diameter of the tube 6 is larger than the diameter of the seed G.

Referring to FIGS. 1 and 2 we shall describe below the working of the appliance in accordance with the invention.

The whole of the appliance of FIG. 1, apart from the cups 1, can be moved by the action of a mechanism which is not shown and allows a movement to be imparted to it which moves it from a position in which the needles 4 dip into the cups 1 and a position in which each needle 4 is just above the compost brick leaving the brick press. The shaft 15 is constantly driven in rotation and thus provides each tube 6 with a rapid vibratory movement along the axis of the associated needle 4. The tube 6 is fastened to the support 7 in such a position that when the tube 6 is at the top dead centre its bottom end is located above the open bottom end of the needle 4. At the bottom dead centre of the tube 6, the bottom end of the tube is, on the other hand, located below the open bottom end of the needle 4, as shown in FIG. 2.

The support 7 can be locked on the rod 8 by means of a screw 7b or slide on the rod 8, in which case the stop 8a defines the bottom dead centre and the top dead centre of the tube 6 when the rod 8 is in the bottom position or in the top position.

When the needle 4 dips into the cup 1 containing the loose grains, the selector, which is connected to connection 5 on the box 2 and which is controlled in accordance with the movement imparted to the appliance as a whole according to FIG. 1, switches the box 2, i.e. the needle 4, to the vacuum source so that one seed G at least is sucked against the bottom opening of the needle 4. If, when the needle 4 dips into the cup, several seeds get sucked against the opening 4, the vibratory movement of the tube 6 detaches the seeds from the needle 4 leaving attached to the opening of the needle 4 only the seed occupying the central position with respect to this opening and thus not being acted on by the tube 6. The vibratory movement of the tube 6 must be fast enough for tube 6 to go up and down several times whilst the needle 4 dips into the seeds contained in the cup 1, so that a seed G is certain to come and take up a central position relative to the opening in the needle 4 and be held against this opening under the action of the low pressure before the needle 4 leaves the cup 1.

The needle 4 with the seed G which is clinging to it is then transferred, due to the movement of the appliance as a whole, above the compost brick to be seeded, with the vacuum being held in the box 2 and thus in the needle 4. When the needle 4 is above the brick to be seeded the selector connected to the connection 5 is reversed so that the box 2 is placed under the pressure of the surrounding air or, preferably, under increased pressure; this detaches the seed G from the needle 4, so that the seed G falls into the compost brick. The whole of the appliance is subsequently moved in the opposite direction, the selector is reversed to place the needle 4 under vacuum and this latter dips into the cup 1 to take a new seed G.

Figure 3:
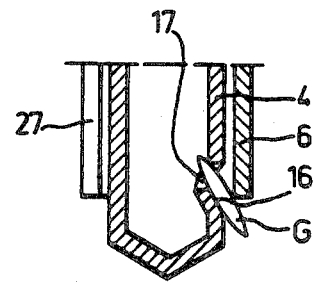

FIG. 3 shows a needle shaped to pick up an oblong-shaped seed G. This kind of seed could in principle be also picked up by a needle open at its bottom end as in FIG. 2. Nevertheless, it is preferable in this case, as shown in FIG. 3, to provide the needle with a lateral recess 16 a short way above its free end having a depth and a width which diminish towards the free end of the needle. The opening 17 is, in this case, made on the side in needle 4, in the deepest and widest part of the recess 16. The seed G thus gets placed, under the action of the vibrations of the tube 6, in the recess 16 so that one of its ends enters the opening 17. The other end of the seed G overhangs the needle 4 laterally. In order to prevent the seed G from being crushed by the tube 6 it is essential for the support 7 of the tube 6 to be capable of sliding on the rod 8 and not be locked by means of the screw 7b so that when a seed G occupies the position shown in FIG. 3, the seed G limits the amplitude of the downward vibratory movement of tube 6 and the tube 6 only bears on seed G with its own weight, which must, of course, be low enough not to damage the seed G.

Nonetheless, the tube 6 detaches all the excess seeds from the needle 4 which might cling to the needle under the action of the vacuum, except for the seed G occupying the position shown in FIG. 3.

Figure 4:
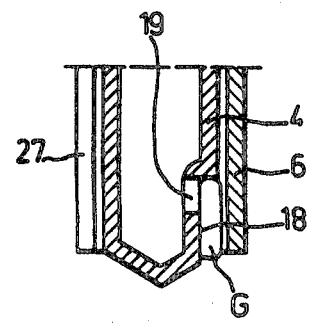

FIG. 4 illustrates a needle 4 the bottom end of which is shaped to pick up a flat-shaped seed G. In this case the needle 4 has a side flat 18 extending from the bottom end of the needle 4 a short distance up. The opening 19 is made in the side of the needle 4, at the top of the flat 18.

As in the embodiment in FIG. 2, the tube 6 can here be clamped to the rod 8 by means of the screw 7b so that the tube 6 positively follows the vibratory movement of the bar 9. However, in both these embodiments it is also possible to let the support 7 slide on the rod 8 as far as the bottom stop 8a, provided the tube 6 is made so that it has enough weight to detach all the surplus seeds from the needle.

Operation of the appliance conforming with the invention has been described above in its application to the transfer of dry seeds contained loose in a cup 1, but the appliance can be used without any modification being made to the needle 4 and the tube 6 to pick up pre-germinated seeds in a liquid medium. For that purpose it is advantageous to set up a circuit of the liquid medium containing the pregerminated seeds in suspension through the successive cups 1 to ensure that each needle 4 encounters at least one seed when it is dipped into a cup. Under the action of the vacuum this seed is sucked against the needle opening and the vibratory movement of tube 6 detaches all the surplus seeds which might stick to the needle not only under the action of the vacuum, but also the from the surface tension effect of the liquid medium.

Figure 5:
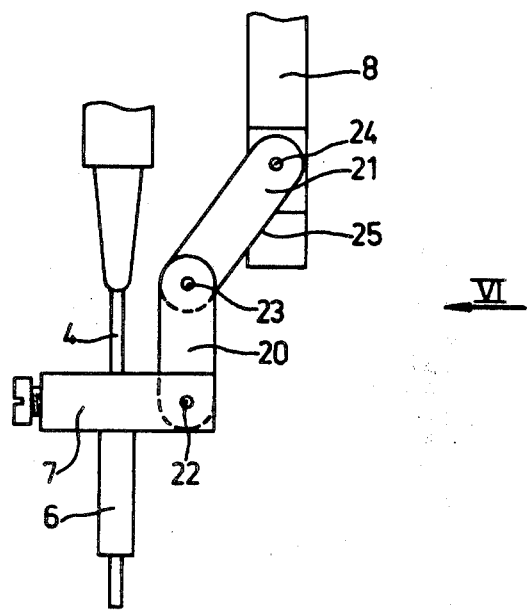
FIGS. 5 and 6 show an embodiment of the system for transmitting the vibratory movement to the tube sliding over the needle.
Figure 6:
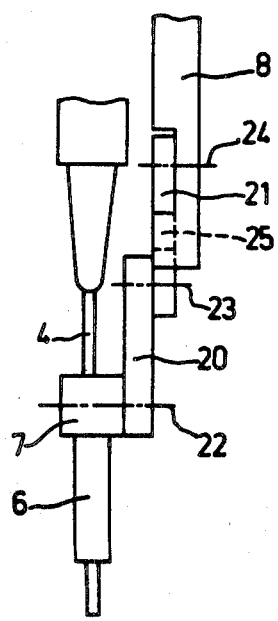

It has also turned out that at certain vibration frequencies applied to the rod 8, the support 7, when it slides over the rod 8 as is necessary to pick up oblong seeds through a side opening (FIG. 3), does not follow the rod 8 properly. This is why it is advantageous, when the support 7 does not have to be clamped to the rod 8, to connect it to this rod, as shown in FIGS. 5 and 6, by a set of two connecting rods 20 and 21 the first of which, roughly vertical, pivots by means of a horizontal pin 22 on the support 7 and by a horizontal pin 23 on connecting rod 21 which itself pivots by a horizontal pin 24 on the rod 8. The rod 8 comprises a stop 25 limiting the downwards pivoting movement of connecting rod 22 so that the latter always keeps inclined with respect to the rod 8 and cannot come into alignment with this rod. During the downwards stroke of the rod 8 the tube 6 drops with the support 7 under gravity until it touches the seed G occupying the position shown in FIG. 3. The subsequent additional drop of the rod 8 makes the connecting rod 21 pivot clockwise round pin 24. In order to prevent the tube 6 from sucking up seeds when it is in the bottom position, owing to the very small clearance between the tube 6 and the needle 4, the tube 6 can have either an internal longitudinal groove 26, as shown in FIG. 2, or a longitudinal slit 27 opposite the needle's side opening, as shown in FIGS. 3 and 4, or, again, side holes a short distance above its bottom end, so that the suction vacuum obtaining at the needle opening does not obtain at the open bottom end of the tube.

In its application to seeding, the appliance according to the invention can be used to pick up and transfer uncoated seeds, sized or otherwise, so-called coated seeds and also pre-germinated seeds, assuring in all cases that the seeds are gripped and transferred one by one, with virtually 100% efficiency.

It should, however, be noted that the appliance is in no way restricted to seeding and may find many other applications, in a very wide range of fields, in picking up very small elements possessing widely varying shapes one by one, for example in counting crystals in the laboratory. It is extremely simple to adapt the appliance to the shape and size of the elements since it suffices to change the needle 4 and the tube 6. Many different versions can be made of the configuration of needle 4, apart from those shown within the framework of the invention, to make it possible to pick up elements with different shapes from the spherical, oblong or flat seeds according to FIGS. 2, 3 and 4.

Finally, when it is required to pick up more than one element, e.g. two or three, each time, it is possible to use a needle 4 possessing several side openings according to FIGS. 3 and 4.

I claim:

1. An apparatus for sequentially removing, one at a time, small sized elements from a receptacle containing a plurality of said elements, and for sequentially transfering said elements, one at a time, to a reception position, comprising a hollow needle having near its free end an opening with a cross-section smaller than the smallest dimension of the elements to be removed; mounting and transferring means for lowering said needle into said receptacle and for withdrawing said needle from said receptacle and for sequentially transferring said elements, one at a time, to the reception position; means for applying a vacuum in the needle when it enters the receptacle and during the transfer of the needle to the reception position and for suppressing the vacuum in the needle at the reception position; a tube slidably mounted on the needle; and means for imparting to said tube a linear oscillating motion along the needle axis to detach from the needle any elements held near the needle opening due to the vacuum effect, except for one element only which occupies the center position with respect to the needle opening.

2. An apparatus according to claim 1 which is adapted for picking up spherical or approximately spherical elements, wherein said needle opening provides a passage along the longitudinal axis of the needle and said tube has an inside diameter exceeding the diameter of the elements to be picked up.

3. An apparatus according to claim 1 which is adapted for picking up flat elements, wherein the needle has a lateral flat portion extending from the free end of the needle to a point above said free end and said opening is made in the side of the needle at the top of the said flat portion.

4. An apparatus according to claim 1 which is adapted for picking up oblong elements, wherein the needle has, at a point above its free end, a lateral recess the depth and width of which diminish towards the free end of the needle, and said opening is made in the side of the needle, in the deepest and widest part of said recess.

5. An apparatus according to claim 1, wherein the said tube is slit on the side.

6. An apparatus according to claim 1, wherein said tube is pierced with lateral holes above its bottom end.

7. An apparatus according to claim 1, wherein said means for imparting an oscillating motion to the tube comprises a support mounting above the needle capable of movement parallel to the axis of the needle, a crank drive for moving said support alternately along the axis of the needle and a bar coupled with said support and with said tube so as to extend parallel to the needle axis.

8. An apparatus according to claim 7, wherein a tube support secured to said tube is slidably mounted on said bar and said bar has a bottom stop for said support.

9. An apparatus according to claim 7, wherein a tube support secured to said tube is connected to said bar by two connecting rods linked together, one of said connecting rods being further linked on said support and the other of said connecting rods being linked on said bar by horizontal pins, one of these connecting rods being substantially vertical and the other in a position inclined to the vertical, a stop on said bar to prevent said other connecting rod from coming into alignment with said bar.

10. An apparatus according to claim 1, wherein said oscillating motion is of an amplitude such that the bottom end of the tube is positioned above the needle opening when the tube is at the highest point of displacement and is positioned below the needle opening when the tube is at the lowest point of displacement.

11. An apparatus according to claim 2, wherein said oscillating motion is of an amplitude such that the bottom end of the tube is positioned above the needle opening when the tube is at the highest point of displacement and is positioned below the needle opening when the tube is at the lowest point of displacement.

12. An apparatus according to claim 3, wherein said oscillating motion is of an amplitude such that the bottom end of the tube is positioned above the needle opening when the tube is at the highest point of displacement and is positioned below the needle opening when the tube is at the lowest point of displacement.

13. An apparatus according to claim 4, wherein said oscillating motion is of an amplitude such that the bottom end of the tube is positioned above the needle opening when the tube is at the highest point of displacement and is positioned below the needle opening when the tube is at the lowest point of displacement.

14. An apparatus according to claim 5, wherein said oscillating motion is of an amplitude such that the bottom end of the tube is positioned above the needle opening when the tube is at the highest point of displacement and is positioned below the needle opening when the tube is at the lowest point of displacement.

15. An apparatus according to claim 6, wherein said oscillating motion is of an amplitude such that the bottom end of the tube is positioned above the needle opening when the tube is at the highest point of displacement and is positioned below the needle opening when the tube is at the lowest point of displacement.

16. An apparatus according to claim 7, wherein said oscillating motion is of an amplitude such that the bottom end of the tube is positioned above the needle opening when the tube is at the highest point of displacement and is positioned below the needle opening when the tube is at the lowest point of displacement.

17. An apparatus according to claim 8, wherein said oscillating motion is of an amplitude such that the bottom end of the tube is positioned above the needle opening when the tube is at the highest point of displacement and is positioned below the needle opening when the tube is at the lowest point of displacement.

18. An apparatus according to claim 9, wherein said oscillating motion is of an amplitude such that the bottom end of the tube is positioned above the needle opening when the tube is at the highest point of displacement and is positioned below the needle opening when the tube is at the lowest point of displacement.

* * * * *